United States Patent [19]

Smuda et al.

[11] Patent Number: 4,475,735
[45] Date of Patent: Oct. 9, 1984

[54] SYSTEM FOR SEALING SHAFTS AGAINST SOLID CONTAINING GASEOUS MEDIA

[75] Inventors: Peter Smuda; Rainer Wernecke; Klaus Werner, all of Freiberg, German Democratic Rep.

[73] Assignee: Brennstoffinstitut Freiberg, Freiberg, German Democratic Rep.

[21] Appl. No.: 460,883

[22] Filed: Jan. 25, 1983

[30] Foreign Application Priority Data

Mar. 8, 1982 [DD] German Democratic Rep. ... 237937

[51] Int. Cl.$^3$ .............................................. F16J 15/40
[52] U.S. Cl. ........................................ 277/3; 277/15; 277/59; 277/72 FM
[58] Field of Search .................. 277/3, 15, 59, 70, 71, 277/72 R, 72 FM, 74–76, 79, 135

[56] References Cited

U.S. PATENT DOCUMENTS

| | | | |
|---|---|---|---|
| 3,213,798 | 10/1965 | Carswell | 277/59 X |
| 3,392,804 | 7/1968 | Fleur et al. | 277/15 X |
| 3,935,710 | 2/1976 | Dickinson | 277/15 X |
| 4,087,097 | 5/1978 | Bossens et al. | 277/3 |

FOREIGN PATENT DOCUMENTS

| | | | |
|---|---|---|---|
| 7601213 | 9/1976 | Netherlands | 277/3 |
| 118185 | 8/1918 | United Kingdom | 277/72 |
| 922234 | 3/1963 | United Kingdom | 277/72 FM |

Primary Examiner—Robert S. Ward
Attorney, Agent, or Firm—Michael J. Striker

[57] ABSTRACT

A system of sealing a shaft from a wearing gaseous compressed medium includes a sealing box arranged on a shaft, a source of scavenging gas, a lubricating element which communicates with the source of scavenging gas so that a lubricant in the lubricating element is under a pressure of scavenging gas higher than a medium pressure in a medium chamber and is supplied to the sealing box, and a throttling element for throttling a portion of scavenging gas from the source and supplying the throttled portion of the scavenging gas into the region of the sealing box.

7 Claims, 2 Drawing Figures

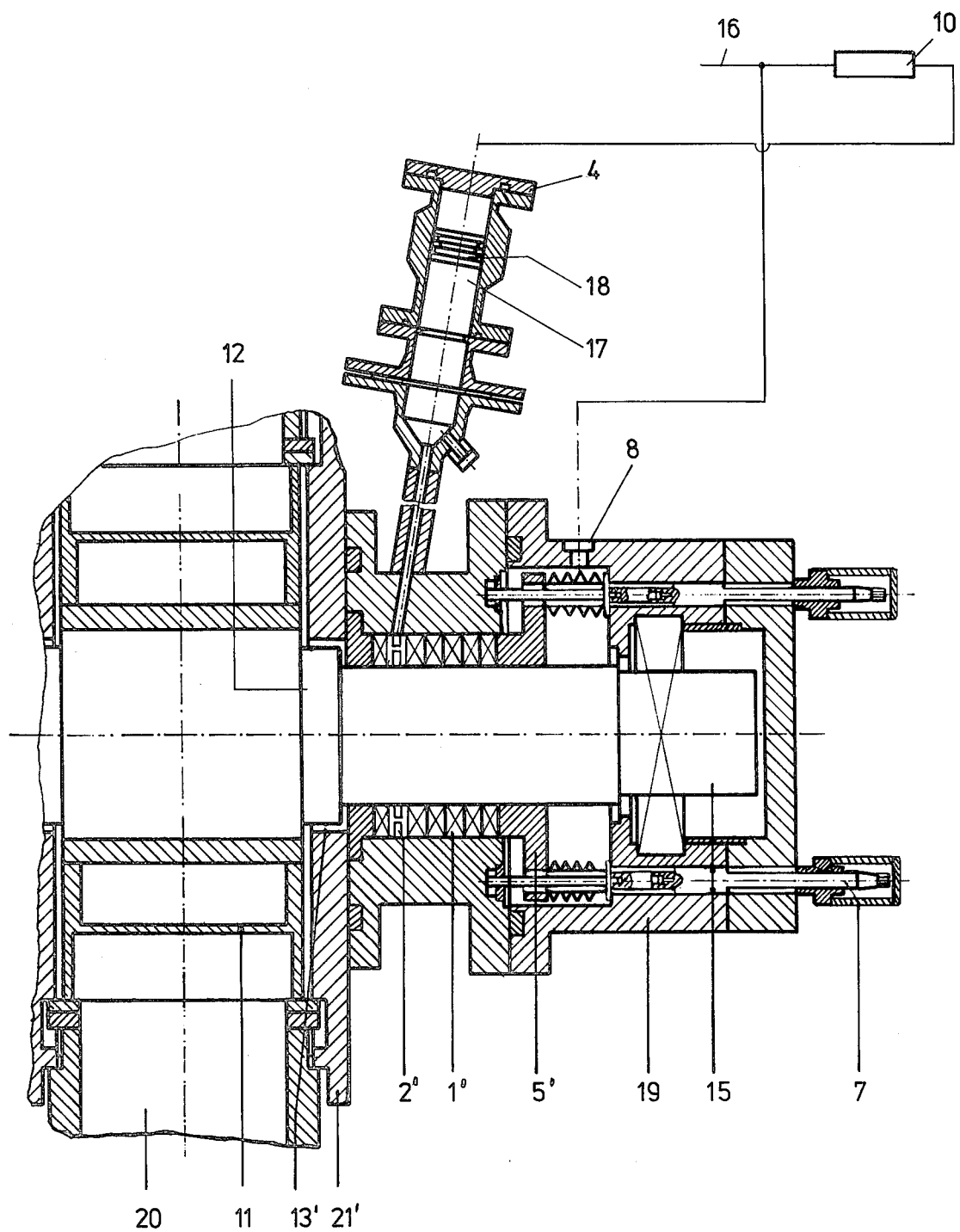

SYSTEM FOR SEALING SHAFTS AGAINST SOLID CONTAINING GASEOUS MEDIA

BACKGROUND OF THE INVENTION

The present invention relates to a sealing system for a shaft against strongly wearing gaseous compressed media.

The sealing systems of the above-mentioned general type are known in the art. Such sealing systems must be provided when subsequent machine elements on rotary shafts must be reliably sealed against highly compressed and strongly wearing media such as for example carrier gas-dust suspensions in dense stream region. It is known to seal from atmosphere, as required from practice, low concentrated dust streams with a concentration of approximately 10–30 kg/m$^3$ in the event of relatively low system pressure approximately 0.2 MPa. These problems in accordance with the prior art are solved by conventional sealing elements or sealing boxes which are eventually expanded by a lubricant ring with a connected lubricant box. In pump and compressors special sealing systems are known which operate with blocking media. The development of the dense stream technology which is used for example in coal dust gasification is connected with higher requirements made to the sealing. Both the dust concentration and the system pressure in this field can be twenty times higher than the above-mentioned values. Experiments show that transmission of these solutions from the sealing systems with low concentrated dust stream with low system pressure to the dense stream technology with high operational pressure and with simultaneous introduction of blocking media leads to service life only approximately 240 hour. Since each sealing box allows insignificant leakage losses in direction of the pressure drop, small dust particles travel with the leakage stream under the sealing box and leads to incrustation on the sliding surface of the sealing box packing thus blocking the shaft in progressing manner.

SUMMARY OF THE INVENTION

Accordingly, it is an object of the present invention to provide a sealing system which avoids the disadvantages of the prior art.

More particularly, it is an object of the present invention to provide a sealing system which guarantees a reliable sealing of rotatable shafts against strongly wearing and highly compressed gaseous media, particularly against highly compressed dust-carrier gas suspension in dense stream region.

It is also an object of the present invention to provide a sealing system for a rotatable shaft which can be used both at its outwardly extending end and also at its butt end, wherein a sealing box is used as a sealing element.

In keeping with these objects and with others which will become apparent hereinafter, one feature of the present invention resides, briefly stated, in a system which includes a combination of a sealing element or box with the utilization of scavenging gas with a pressure higher than the system pressure, for scavenging and applying pressure to a lubricating medium.

An important feature of the present invention is the availability of a scavenging gas which advantageously is identical with the respective medium or the carrier gas of a dust-carrier gas suspension and must be under a higher pressure than the system pressure.

The scavenging gas is used in accordance with the present invention for acting in a lubricant head with a pressure for lubricating the sealing box, on the one hand, and it is also throttled to a pressure which is somewhat higher than the system pressure for scavenging and/or applying pressure to the encased support or bearing at the shaft end.

The inventive combination of the sealing box, pressure-actuated lubricant medium, and scavenging gas can be realized in two embodiments.

One of the embodiments is used for a driving end of the shaft. A lubricating ring having circular grooves is formed as a last but one packing element of the sealing box as considered from a gland, and communicates via an opening with the lubricating head. The lubricating head is so formed in its upper part that the lubricant is acted upon by the scavenging gas pressure which is higher than the system pressure. Between the sealing box and the medium or suspension chamber, there is an additional recess which forms a small gap between the shaft and the housing. The scavenging gas portion which is throttled slightly above the system pressure is pressed through this gap via a flow chamber and a distributing sheet.

Because of the continuous gas flow in the gap between the shaft and the housing in direction of the medium chamber, penetration of the foreign particles in the region of the sealing box is prevented. Because of this arrangement, insignificant leakage gas quantities are compensated in such a way that the dust free scavenging gas covers the leakage gas quantity and prevents entrainment of solid particles in the sealing region. If nevertheless because of the pressure variations, solid particles would penetrate through the freely scavenged gap in the sealing region, a lubricating grease-solid matter mixture is formed in the sealing box on the outer surface of the shaft. With the aid of the lubricating medium which is under higher pressure than the scavenging gas in the said gap between the shaft and the housing, fissures which are formed during short-time unloading or setting of the elements of the packing box are filled with lubricating medium. Thereby a continuous lubricant movement from the lubricant ring in direction of the sealing gland (outer atmosphere) takes place. The speed of the lubricant movement depends upon the selection of the suitable pressure ratio between the lubricant pressure and the pressure of the throttled scavenging gas portion, and the lubricant consumption can be minimized by the proper adjustment of the pressure differential.

The second embodiment serves mainly for sealing the bearing units of the shaft butts. Starting point here is again the combination of the sealing box, lubricant under pressure, and scavenging gas. The shaft end is encased in accordance with the invention in a pressure tight manner. The scavenging pressure which in correspondence with the first embodiment is higher than the system pressure acts here also on the lubricant medium. The pressure of the throttled scavenging gas portion which is slightly higher than the system pressure acts from the outer side of the sealing box. The arrangement of the lubricant ring is performed similarly to the embodiment at the driving side of the shaft. Since the pressure acts in the second embodiment in the entire bearing chamber including the seal packing rings, it is guaranteed that in the event of failure of the lubricant device a sufficiently great pressure difference takes place so that no gas stream with the accompanied solid matter transport can take place through the sealing box. The pressure formed behind the sealing box also prevents a fast lubricant transport through the packing element in the case of loosening of the sealing box during setting or unloading of the seal packing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing the sealing system for a shaft, in accordance with another embodiment of the invention.

DESCRIPTION OF THE PREFERRED EMBODIMENTS

Figure 1:
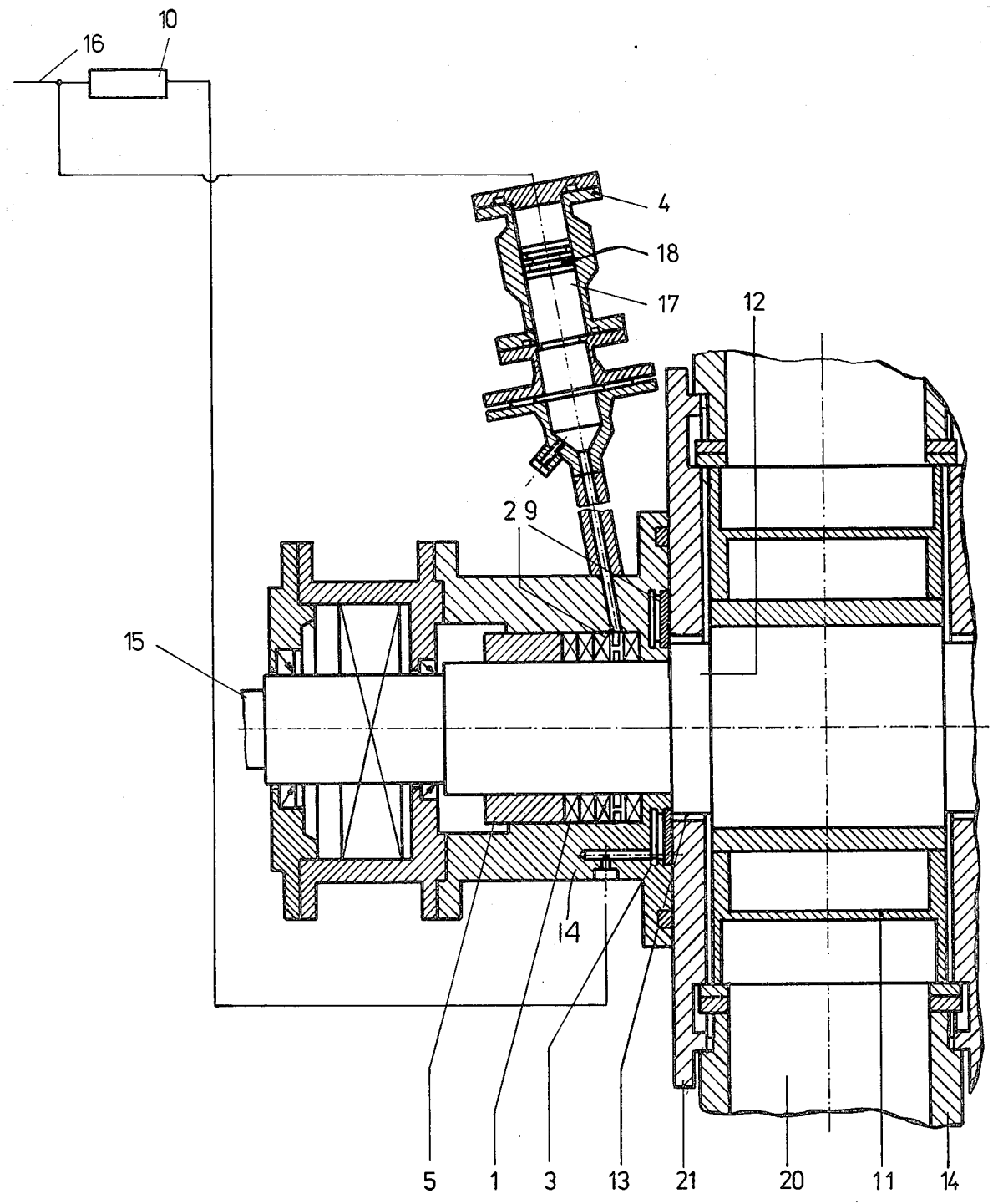
FIG. 1 of the drawing is a view showing the sealing system for a shaft, in accordance with one embodiment of the present invention.

The drawing shows a bucket wheel valve in which two embodiments of the sealing system in accordance with the present invention are provided. The bucket wheel valve serves for supplying and dosing a dust-carrier gas suspension in dense stream region, or in other words a suspension with a solid matter/carrier gas ratio of 600 kg/m$^3$ which is under pressure of 2.5 MPa.

A sealing system in accordance with one embodiment of the invention suitable for a driving end of a shaft 15 is shown in FIG. 1 of the drawing. A packing unit of this sealing system is identified with reference numeral 1. A lubricating ring 2 forms a last but one element of the packing unit 1, as seen from a gland 5 outwardly. The lubricating ring 2 has inner and outer circular grooves connected with a lubricating head 4. A supply chamber for lubricating medium 17 in the lubricating head 4 is subjected via a piston 18 to a pressure of a scavenging gas whose pressure is higher than the system pressure of the dust-carrier gas suspension and which is advantageously identical to the carrier gas. Thereby, when the packing unit 1 is loosened or set, the thus-produced fissures are filled with lubricating medium and movement of the lubricating medium from the lubricating ring 2 in direction to the gland 5 takes place.

A flow chamber 3 for the scavenging gas is provided in a housing 14 and communicates via respective openings and conduits with a scavenging gas or line 16 which interposition of a throttling device 10. Because of the incorporation of the throttling device 10, the scavenging gas pressure is throttled to such an extent that it lies only slightly above the system pressure of the dust-carrier gas suspension. The scavenging gas flows from the flow chamber 3 via a distributing sheet 9 for the scavenging gas through a gap 13 formed by a shaft portion 12 and a housing cover 21, additionally into the dust stream.

Because of the provision of the gap 13 which is located prior to the packing unit 1 and is freely scavenged, constant scavenging gas stream takes place and makes unlikely penetration of dust particles into the sealing region. Insignificant leakage gas quantities of the sealing are covered by the dust-free scavenging gas. When however because of the pressure variation dust particles travel through the gap, penetration of lubricating grease because of the high pressure of the lubricating medium is simultaneously guaranteed. The lubricant consumption is controllable by proper adjustment of the pressure differential at the throttling device 10.

FIG. 2 shows the shaft provided with the sealing system in accordance with the second embodiment. It deals with a shaft butt whose bearing unit is encased in a pressure-tight manner. The packing unit 1' is provided again with the lubricating ring 2' which occupies the place of the last but one packing element as seen from the gland 5. The lubricating ring 2' is also provided with the circular grooves communicating with the lubricating head subjected to the action of the scavenging gas. The characteristic feature of this embodiment is that the throttled portion of the scavenging gas for pressure action upon the packing unit 1' is used at the side of the gland 5'. A bearing casing 19 communicates with the throttling device 10 via a pressure compensating pipe 8. The pressure tight bearing casing 19 which is subjected to the action of the throttled scavenging gas pressure somewhat higher than the system pressure of the dust-carrier gas suspension guarantees that no pressure drop from the pressure bucket wheel valve in direction of the bearing groups takes place through the sealing. Thereby regions for transport of dust particles in the sealing element is eliminated.

Similarly to the embodiment 1, the fissures which are formed are filled by the lubricating medium under pressure. A lubricating medium cushion is produced, as seen from the bucket wheel 11, in the gap 13' between the shaft 15 and the housing cover 21' and eventually admits penetrated dust particles. As a result of this, after a certain time a mixture of lubricating medium and dust is produced there, which however does not lead to fixed running of the shaft 15. The advantage of this construction is that no additional gas portion which is in many cases undesirable is supplied to the dust-carrier gas suspension. The sealing system is based in this case on the static pressure behind the sealing unit 1 which excludes leakage gas losses through the sealing, and also on the utilization of the lubricant medium at a predetermined pressure. The lubricating medium consumption is minimized by the adjustment of the proper pressure condition at the throttling device 10, and the height of the pressure level of the scavenging gas above the system pressure is of importance.

For adjusting the sealing gland 5', an adjusting device 7 is provided and extends through the bearing casing 19 in a pressure-tight manner. Thereby, the sealing gland 5' can be adjusted during the operation of the bucket wheel valve.

Lengthy experiments were conducted on a testing stand similar to the above-described pressure bucket wheel valve in accordance with the invention. It has been shown that during supplying and dosing a gas-carrier gas suspension in dense stream region, the inventive construction provides for more reliable sealing and bearing condition as compared with the known solutions. Blocking of the shaft during failure of the sealing element, which is not precluded in the event of utilization of either conventional solutions, cannot take place in the inventive construction.

It will be understood that each of the elements described above, or two or more together, may also find a useful application in other types of construction differing from the types described above.

While the invention has been illustrated and described as embodied in a system of sealing shafts from wearing gaseous compressed media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A system of sealing a shaft from a wearing gaseous compressed medium accommodated at a medium pressure in a medium chamber, the system comprising a sealing box arranged on a shaft; a source of scavenging gas; lubricating means which communicates with said source of scavenging gas so that a lubricant in said lubricating means is under a pressure of scavenging gas higher than the medium pressure in the medium chamber and is supplied to said sealing box; and means for throttling a portion of scavenging gas from said source, said means for throttling being arranged so that the pressure of the throttled portion of scavenging gas is lower than the pressure in said lubricating means but higher than the medium pressure in the medium chamber, and supplying the throttled portion of scavenging gas into the region of said sealing box.

2. A system as defined in claim 1, wherein said sealing box includes a sealing gland, a packing unit consisting of some packing members, said lubricating system including a lubricating head and lubricating ring formed as a last but one member of said packing unit as considered from said sealing gland, said lubricating ring having inner and outer circular grooves and communicating with said lubricating head, and said lubricating head accommodating the lubricant under the pressure of scavenging gas higher than the medium pressure in the medium chamber.

3. A system as defined in claim 2; and further comprising a housing, and means forming a gap between the shaft and the housing, connecting the medium chamber and the region of said sealing box, and said gap communicating with said throttling means, said throttling means being arranged so that pressure of scavenging gas after said throttling means is somewhat greater than the pressure in the medium chamber.

4. A system as defined in claim 3; and further comprising a distributing sheet and a housing having an opening arranged so that said gap communicates with said throttling means via said distributing sheet and said opening.

5. A system as defined in claim 2; wherein the shaft has a supported end; and further comprising a casing surrounding the supported end of the shaft, and a pressure-equalizing pipe communicating said casing with said throttling means so as to apply pressure upon said packing unit at the supported end of the shaft.

6. A system as defined in claim 1, wherein the medium in the medium chamber is a gaseous medium, said source of scavenging gas being arranged so as to supply a scavenging gas identical with the gaseous medium in the medium chamber.

7. A system as defined in claim 6; and further comprising means for adjusting said sealing gland and extending through and outwardly beyond said casing in a pressure tight manner.

* * * * *